US009038048B2

(12) United States Patent
Yang et al.

(10) Patent No.: US 9,038,048 B2
(45) Date of Patent: May 19, 2015

(54) METHODS, SYSTEMS, AND MEDIA FOR PROTECTING APPLICATIONS FROM RACES

(75) Inventors: Junfeng Yang, New York, NY (US); Heming Cui, New York, NY (US); Jingyue Wu, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 412 days.

(21) Appl. No.: 13/189,263

(22) Filed: Jul. 22, 2011

(65) Prior Publication Data

US 2012/0096449 A1   Apr. 19, 2012

Related U.S. Application Data

(60) Provisional application No. 61/366,900, filed on Jul. 22, 2010.

(51) Int. Cl.
*G06F 9/44*  (2006.01)
*G06F 9/52*  (2006.01)

(52) U.S. Cl.
CPC ........................................ *G06F 9/52* (2013.01)

(58) Field of Classification Search
CPC ................ G06F 8/65; G06F 8/67; G06F 8/68
USPC ......................................... 717/110, 111, 168
See application file for complete search history.

(56) References Cited

U.S. PATENT DOCUMENTS

| 4,318,182 | A | * | 3/1982 | Bachman et al. ............. 718/105 |
| 5,948,112 | A | | 9/1999 | Shimada et al. |
| 6,101,524 | A | | 8/2000 | Choi et al. |
| 6,226,787 | B1 | | 5/2001 | Serra et al. |
| 6,567,937 | B1 | | 5/2003 | Flores et al. |
| 6,625,635 | B1 | | 9/2003 | Elnozahy |
| 6,745,222 | B1 | | 6/2004 | Regehr et al. |
| 6,854,108 | B1 | | 2/2005 | Choi |
| 7,010,788 | B1 | | 3/2006 | Rehg et al. |
| 7,366,768 | B2 | * | 4/2008 | Deo et al. ..................... 709/217 |
| 7,506,318 | B1 | | 3/2009 | Lindo et al. |

(Continued)

FOREIGN PATENT DOCUMENTS

WO   WO/2009/114645   3/2009

OTHER PUBLICATIONS

International Preliminary Report on Patentability in International Patent Application No. PCT/US2007/012784, filed May 31, 2007, mailed Dec. 3, 2008.

(Continued)

*Primary Examiner* — Anna Deng
(74) *Attorney, Agent, or Firm* — Byrne Poh LLP

(57) ABSTRACT

Methods, systems, and media for protecting applications from races are provided. In some embodiments, methods for protecting applications from races are provided, the methods comprising: adding to at least one cycle of the application an update check to determine when an update to the application is to be made; adding an update engine to the application, wherein the update engine is configured to: receive an update plan that is based on an execution filter that specifies how operations of the application are to be synchronized; and cause synchronization operations to be added to the application based on the update plan that prevent the race from occurring.

20 Claims, 13 Drawing Sheets

(56) References Cited

U.S. PATENT DOCUMENTS

| | | | |
|---|---|---|---|
| 7,574,686 | B1 | 8/2009 | Wadland et al. |
| 7,958,497 | B1 | 6/2011 | Lindo et al. |
| 2006/0075306 | A1 | 4/2006 | Chandrasekaran |
| 2007/0083565 | A1* | 4/2007 | McKenney ............... 707/200 |
| 2008/0028382 | A1 | 1/2008 | Arnold et al. |
| 2008/0098339 | A1* | 4/2008 | Chan .......................... 716/6 |
| 2008/0120619 | A1 | 5/2008 | Podila |
| 2009/0019431 | A1 | 1/2009 | George et al. |
| 2009/0165006 | A1 | 6/2009 | Ceze et al. |
| 2009/0235262 | A1 | 9/2009 | Ceze et al. |
| 2011/0296432 | A1* | 12/2011 | Rajan et al. ............... 719/312 |

OTHER PUBLICATIONS

Abadi, M., et al., "Control-Flow Integrity: Principles, Implementations, and Applications", In Proceedings of the 12th ACM Conference on Computer and Communications Security (CCS '05), Alexandria, VA, USA, Nov. 7-11, 2005, pp. 340-353.

Altekar, G. and Stoica, I., "ODR: Output-Deterministic Replay for Multicore Debugging", In Proceedings of the 22nd ACM Symposium on Operating Systems Principles (SOSP '09), Big Sky, MT, USA, Oct. 11-14, 2009, pp. 193-206.

Altekar, G., et al., "OPUS: Online Patches and Updates for Security", In Proceedings of the 14th USENIX Security Symposium (SSYM '05), vol. 14, No. 19, Baltimore, MD, USA, Jul. 31-Aug. 5, 2005, pp. 287-302.

Anagnostakis, K.G., et al., "Detecting Targeted Attacks Using Shadow Honeypots", In Proceedings of the 14th USENIX Security Symposium (SSYM '05), Baltimore, MD, USA, Jul. 31-Aug. 5, 2005, pp. 129-144.

Appavoo, J., et al., "Enabling Autonomic System Software with Hot-Swapping", White Paper, Nov. 2002, available at: http://web.archive.org/web/20060316175537/http://www.research.ibm.com/K42/papers/auto-vis.pdf.

Appavoo, J., et al., "K42 Overview", White Paper, Aug. 2002, available at: http://web.archive.org/web/20060316175757/http://www.research.ibm.com/K42/white-papers/Overview.pdf.

Appavoo, J., et al., "K42's Performance Monitoring and Tracing Infrastructure", White Paper, Aug. 2002, available at: http://web.archive.org/web/20060316175558/http://www.research.ibm.com/K42/white-papers/PertMon.pdf.

Appavoo. J., et al., "Memory Management in K42", White Paper, Aug. 2002, available at: http://web.archive.org/web/20060316175717/http://www.research.ibm.com/K42/white-papers/MemoryMgmt.pdf.

Appavoo. J., et al., "Scheduling in K42", White Paper, Aug. 2002, available at: http://web.archive.org/web/20060316175724/http://www.research.ibm.com/K42/white-papers/Scheduling.pdf.

Appavoo. J., et al., "Utilizing Linux Kernel Components in K42", White Paper, Aug. 2002, available at: http://web.archive.org/web/20060316175819/http://www.research.ibm.com/K42/white-papers/LKIntern.pdf.

Arnold, J. and Kaashoek, F.M., "Ksplice: Automatic Rebootless Kernel Updates", In Proceedings of the 4th ACM European Conference on Computer Systems (EuroSys '09), Nuremberg, DE, Apr. 1-3, 2009, pp. 187-198.

Auslander, M., et al, "Customization Lite", In Proceedings of the 6th Workshop on Hot Topics in Operating Systems (HotOS-VI '97), Cape Cod, MA, USA, May 5-6, 1997, pp. 43-48.

Avijit, K., et al., "TIED, LibsafePlus: Tools for Runtime Buffer Overflow Protection", In Proceedings of the 13th USENIX Security Symposium, San Diego, CA, USA, Aug. 9-13, 2004, pp. 45-56.

Baumann, A., et al., "Providing Dynamic Update in an Operating System", In Proceedings of the 2005 USENIX Annual Technical Conference (USENIX '05), Anaheim, CA, USA, Apr. 10-15, 2005, pp. 279-291.

Bergan, T., et al., "CoreDet: A Compiler and Runtime System for Deterministic Multithreaded Execution", In Proceedings of the 15th International Conference on Architectural Support for Programming Languages and Operating Systems (ASPLOS '10), Pittsburgh, PA, USA, Mar. 13-17, 2010, pp. 53-64.

Berger, E.D., et al., "Grace: Safe Multithreaded Programming for C/C++", In Proceedings of the 24th Annual ACM SIGPLAN Conference on Object-Oriented Programming, Systems, Languages, and Applications (OOPSLA '09): Orlando, FL, USA, Oct. 25-29, 2009, pp. 81-96.

Boyd, J., "OODA Loop: Observation, Orientation, Decision, Action", MindSim.com, Feb. 8, 2007, available at. http://mindsim.com/MindSim/Corporate/OODA.html.

Bruening, D. and Chapin, J., "Systematic Testing of Multithreaded Programs", Technical Report MIT-LCS-TM-607, Massachusetts Institute of Technology, May 2, 2000, pp. 1-11.

Bruening, D.L., "Efficient, Transparent, and Comprehensive Runtime Code Manipuiation", Ph.D Dissertation, Massachusetts Institute of Technology, Sep. 2004, pp. 1-306.

Buck, B. and Halingsworth, J.K., "An API for Runtime Code Patching", In International Journal of High Performance Computing Applications, vol. 14, No. 4, Nov. 2000, pp. 317-329.

Cadar, C. and Engler D.R., "Execution Generated Test Cases: How to Make Systems Code Crash Itself", In Proceedings of the 12th International SPIN Workshop (SPIN '05), San Francisco, CA, USA, Aug. 22-24, 2005, pp. 2-23.

Cadar, C., et al., "EXE: Automatically Generating Inputs of Death", In Proceedings of the 13th ACM Conference on Computer and Communicatons Security (CCS '06), Alexandria, VA, USA, Oct. 30-Nov. 3, 2006, pp. 322-335.

Cadar, C., et al., "KLEE: Unassisted and Automatic Generation of High-Coverage Tests for Complex Systems Programs", In Proceedings of the 8th Symposium on Operating Systems Design and Implementation (OSDI '08), San Diego, CA, USA, Dec. 8-10, 2008, pp. 209-224.

Candea, G. and Fox, A., "Crash-Only Software", In Proceedings of the 9th Workshop on Hot Topics in Operating Systems (HotOS-IX), Lihue (Kauai), HI, USA, May 18-21, 2003, pp. 67-72.

Candea, G. and Fox, A., "Recursive Restartability: Turning the Reboot Sledgehammer into a Scalpel", In Proceedings of the 8th Workshop on Hot Topics in Operating Systems (HotOS-VIII '01), Elmau/Oberbayern, DE, May 20-23, 2001, pp. 125-130.

Candea, G., et al., "Automated Software Testing as a Service", In Proceedings of the 1st ACM Symposium on Cloud Computing (SOCC '10), Indianapolis, IN, USA, Jun. 10-11, 2010, pp. 155-160.

Castro, M., et al., "Better Bug Reporting with Better Privacy", In Proceedings of the 13th International Conference on Architectural Support for Programming Languages and Operating Systems (ASPLOS XIII '08), Seattle, WA, USA, Mar. 1-5, 2008, pp. 319-328.

Chen, H., et al., "Live Updating Operating Systems using Virtualization", In Proceedings of the 2nd International Conference on Virtual Execution Environments (VEE '06), Ottawa, ON, CA, Jun. 14-16, 2006, pp. 35-44.

Chipounov, V., et al., "Selective Symbolic Execution", In Proceedings of the 5th Workshop on Hot Topics in System Dependability (HotDep '09), Lisbon, PT. Jun. 29, 2009.

Cordy, J.R., et al., "Source Transformation in Software Engineering Using the TXL Transformation System", In Jounal of Information and Software Technology, vol. 44, No. 13, Oct. 1, 2002, pp. 827-837.

Costa, M., et al., "Bouncer: Securing Software by Blocking Bad Input", In Proceedings of the 21st ACM Symposium on Operating Systems Principles (SOSP '07), Stevenson, WA, USA, Oct. 14-17, 2007, pp. 117-130.

Costa, M., et al., "Vigilante: End-to-End Containment of Internet Worms", In Proceedings of the 20th ACM Symposium on Operating Systems Principles (SOSP '05), Brighton, UK, Oct. 23-26, 2005, pp. 133-147.

Cowan, C., et al., "FormatGuard: Automatic Protection From printf Format String Vulnerabilites", In Proceedings of the 10th USENIX Security Symposium (SSYM '01), Washington, DC, USA, Aug. 13-17, 2001, pp. 191-199.

Cowan, C., et al., "Stackguard: Automatic Adaptive Detection and Prevention of Buffer-Overflow Attacks", In Proceedings of the 7th USENIX Security Symposium (SSYM '98), San Antonio, TX, USA, Jan. 26-29, 1998, pp. 63-78.

(56) References Cited

OTHER PUBLICATIONS

Crosby, S.A. and Wallach, D.S., "Denial of Service via Algorithmic Complexity Attacks", In Proceedings of the 12th USENIX Security Symposium (SSYM '03), Washington, DC, USA, Aug. 4-8, 2003, pp. 29-44.
Demsky, B. and Rinard, M.C., "Automatic Detection and Repair of Errors in Data Structures", In Proceedings of the 18th Annual ACM SIGPLAN Conference on Obiect Oriented Programming, Systems, Languages, and Applications (OOPSLA '03), Anaheim, CA, USA, Oct. 26-30, 2003, pp. 78-95.
Devietti, J., et al., "DMP: Deterministic Shared Memory Multiprocessing", In Proceedings of the 14th International Conference on Architectural Support for Programming Languages and Operating Systems (ASPLOS '09), Washington, DC, USA. Mar. 7-11, 2009. pp. 85-96.
Dunlap, G.W., et al., "Execution Replay of Multiprocessor Virtual Machine", In Proceedings of the 4th International Conference on Virtual Execution Environments (VEE '08), Seattle, WA, USA, Mar. 6-7, 2008, pp. 121-130.
Dunlap, G.W., et al., "ReVirt: Enabling Intrusion Analysis Through Virtual-Machine Logging and Replay", In Proceedings of the Fifth Symposium on Operating Systems Design and Implementation (OSDI '02), Boston, MA, USA, Dec. 9-11, 2002, pp. 211-224.
Eich, B., "Mozilla Bug 133773", Bugzilla, Mar. 27, 2002, available at: https://bugzilla.mozilla.org/show_bug.cgi?id=133773.
Engler, D. and Ashcraft, K., "RacerX: Effective, Static Detection of Race Conditions and Deadlocks", In Proceedings of the ACM Symposium on Operating Systems Principles (SOSP '03), Bolton Landing, NY, USA, Oct. 19-22, 2003.
Engler, D., et al., "Checking System Rules using System-Specific, Programmer-Written Compiler Extensions", In Proceedings of the 4th Symposium on Operating Systems Design and Implementation (OSDI'00). San Diego, CA, USA, Oct. 23-25, 2000, pp. 1-16.
Etoh, J., "GCC Extension for Protecting Applications From Stack-Smashing Attacks", TRL.IBM.com, Aug. 22. 2005, available at: http://www.trl.ibm.com/projects/security/ssp.
Ford, B. and Cox, R., "Vx32: Lightweight User-Levet Sandboxing on the x86", In Proceedings of the USENIX Annual Conference (USENIX '08), Boston, MA, USA, Jun. 22-27, 2008, pp. 293-306.
Geels, D., et al., "Friday: Global Comprehension for Distributed Replay", In Proceedings of the Fourth Symposium on Networked Systems Design and Implementation (NSDI '07), Cambridge, MA, USA, Apr. 11-13, 2007, pp. 285-298.
Gilchrist, J., "Parallel BZIP2 (PBZIP2)", Compression.ca, Jul. 18, 2011, available at: http://compression.ca/pbzip2/.
Gilmore, S., et al., "Dynamic ML without Dynamic Types", Technical Report ECS-LFCS-97-378, University of Edinburgh, 1997.
Godefroid, P., et al., "Automated Whitebox Fuzz Testing", In Proceedings of 15th Network and Distributed System Security Sumposium (NDSS '08), San Diego, CA, USA, Feb. 10-13, 2008.
Godefroid, P., et al., "Dart: Directed Automated Random Testing", In Proceedings of the ACM SIGPLAN 2005 Conference on Programming Language Design and Implementation (PLDI '05), Chicago, IL, USA, Jun. 12-15, 2005, pp. 213-223.
Godefroid, P., et al., "Grammar-Based Whitebox Fuzzing", In Proceedings of the ACM SIGPLAN 2008 Conference on Programming Language Design and Implementation (PLDI '08), Tucson, AZ, USA, Jun. 7-13, 2008, pp. 206-215.
Guo, Z., et al., "R2: An Application-Level Kernel for Record and Replay", In Proceedings of the 8th USENIX Symposium on Operating Systems Design and Implementation (OSDI '08), San Diego, CA, USA, Dec. 8-10, 2008, pp. 193-208.
Gupta, D., et al., "A Formal Framework for On-line Software Version Change", In IEEE Transactions on Software Engineering, vol. 22, No. 2, Feb. 1996, pp. 120-131.
Hecht, M.S. and Ullman, J.D., "Characterizations of Reducible Flow Graphs", In Journal of the ACM, vol. 21, No. 3 Jul. 1974, pp. 367-375.

Hunt, G. and Brubacher, D., "Detours: Binary Interception of Win32 Functions", In Proceedings of the 3rd USENIX Windows NT Symposium (WINSYM '99), Seattle, WA, USA, Jul. 12-13, 1999, pp. 135-144.
International Search Report in International Patent Application No. PCT/US2007/012784, filed May 31, 2007, mailed Jul. 14, 2008.
Joshi, P., et al., "A Randomized Dynamic Program Analysis Technique for Detecting Real Deadlocks", In Proceedings of the ACM SIGPLAN 2009 Conference on Programming Language Design and Implementation (PLDI '09), Dublin, IE, Jun. 15-21, 2009, pp. 110-120.
Jula H., et al., "Deadlock Immunity: Enabling Systems to Defend Against Deadlocks", In Proceedings of the 8th Symposium on Operating Systems Design and Implementation (OSDI '08), San Diego, CA, USA, Dec. 8-10, 2008, pp. 295-308.
Kiczales, G., et al., "Aspect-Oriented Programming", In Proceedings of the 11th European Conference on Object-Oriented Programming (ECOOPS '97), Jyväskylä, FI, Jun. 9-13, 1997, pp. 220-242.
Kiriansky, V., et al., "Secure Execution Via Program Shepherding", In Proceedings of the 11th USENIX Security Symposium (SSYM '02), San Francisco, CA, USA, Aug. 5-9, 2002, pp. 191-205.
Konuru, R., et al., "Deterministic Replay of Distributed Java Applications", In Proceedings of the 14th International Symposium on Parallel and Distributed Processing (IPDPS '00), Cancun, MX, May 1-5, 2000, pp. 219-228.
Lee, E.A., "The Problem with Threads", In IEEE Computer, vol. 39, No. 5, May 2006, pp. 33-42.
Liblit, B., et al., "Bug Isolation via Remote Program Sampling", In Proceedings of the ACM SIGPLAN 2003 Conference on Programming Language Design and Implementation (PLDI '03), San Diego, CA, USA, Jun. 9-11, 2003, pp. 141-154.
Locasto, M.E., et al., "Quantifying Application Behavior Space for Detection and Self-Healing", Technical Report CUCS-017-06, Columbia University, 2006.
Locasto, M.E., et al., "Software Self-Healing Using Collaborative Application Communities", In Proceedings of the Network and Distributed System Security Symposium (NDSS '06), San Diego, CA, USA, Feb. 1-3, 2006.
Lu, S., et al., "AVIO: Detecting Atomicity Violations via Access Interleaving Invariants", In Proceedings of the 12th Internationai Conference on Architectural Support for Programming Languages and Operating Systems (ASPLOS '06), San Jose, CA, USA, Oct. 21-25, 2006, pp. 37-48.
Lu, S., et al., "Learning from Mistakes—A Comprehensive Study on Real World Concurrency Bug Characteristics", In Proceedings of the 13th International Conference on Architectural Support for Programming Languages and Operating Systems (ASPLOS XIII '08), Seattle, WA, USA, Mar. 1-5, 2008, pp. 329-339.
Lu, S., et al., "MUVI: Automatically Inferring Multi-Variable Access Correlations and Detecting Related Semantic and Concurrency Bugs", In Proceedings of the 21st ACM Symposium on Operating Systems Principles (SOSP '07), Stevenson, WA, USA, Oct. 14-17, 2007, pp. 103-116.
Luk, C., et al., "Pin: Building Customized Program Analysis Tools with Dynamic Instrumentation", In Proceedings of the ACM SIGPLAN 2005 Conference on Programming Language Design and Implementation (PLDI '05), Chicago, IL, USA, Jun. 12-15, 2005, pp. 190-200.
Makris, K. and Ryu, K.D., "Dynamic and Adaptive Updates of Non-Quiescent Subsystems in Commodity Operating System Kernels", In Proceedings of the 2nd ACM SIGOPS/EuroSys European Conference on Computer Systems (EuroSys '07), Lisbon, PT, Mar. 21-23, 2007, pp. 327-340.
Miller, B., et al., "Fuzz Revisited: A Re-Examination of the Reliability of UNIX Utilities and Services", Technical Report, University of Wisconsin, Oct. 1995.
Montesinos, P., et al., "Capo: A Software-hardware Interface for Practical Deterministic Multiprocessor Replay", In Proceedings of the 14th International Conference on Architectural Support for Programming Languages and Operating Systems (ASPLOS '09), Washington, DC, USA, Mar. 7-11, 2009, pp. 73-84.

(56) References Cited

OTHER PUBLICATIONS

Mosberger, D. and Jin, T., "httperf—A Tool for Measuring Web Server Performance", In ACM SIGMETRICS Performance Evaluation Review, vol. 26, No. 3, Dec. 1998, pp. 31-37.
Musuvathi, M., et al., "Finding and Reproducing Heisenbugs in Concurrents Programs", In Proceedings of the Eight Symposium on Operating Systems Design and Implementation (OSDI '08), San Diego, CA, USA, Dec. 8-10, 2008, pp. 267-280.
Neamtiu, I. and Hicks, M., "Safe and Timely Dynamic Updates for Multi-Threaded Programs", In Proceedings of the ACM SIGPLAN 2009 Conference on Programming Language Design and Implementation (PLDI: '09), Dublin, IE, Jun. 15-21, 2009, pp. 13-24.
Neamtiu, I., et al., "Practical Dynamic Software Updating for C", In Proceedings of the ACM SIGPLAN 2006 Conference on Programming Language Design and Implementation, Ottawa, ON, CA, Jun. 11-14, 2006, pp, 72-83.
Necula, G.C., et al., "CCured: Type-Safe Retrofitting of Legacy Code", In Proceedings of the Principles of Programming Language (PoPL '02), Portland, OR, USA, Jan. 16-18, 2002, pp. 128-139.
Necula, G.C., et al., "Cil: Intermediate Language and Tools for Analysis and Transformation of C Programs", In Proceedings of Conference on Compiler Construction (CC '02), Grenoble, FR, Apr. 8-12, 2002, pp. 213-228.
Newsome, J., "Vulnerability-Specific Execution Filtering for Exploit Prevention on Commodity Software", In Proceedings of the 13th Symposium on Network and Distributed System Security (NDSS '06), San Diego, CA, USA, Feb. 1-3, 2006.
Olszewski, M., et al., "Kendo: Efficient Deterministic Multithreading in Software", In Proceedings of the 14th International Conference on Architectural Support for Programming Languages and Operating Systems (ASPLOS '09), Washington, DC, USA, Mar. 7-11, 2009, pp. 97-108.
Park, C.S. and Sen, K., "Randomized Active Atomicity Violation Detection in Concurrent Programs", In Proceedings of the 16th ACM SIGSOFT International Symposium on Foundations of Software Engineering (SIGSOFT '08/FSE-16), Atlanta, GA, USA, Nov. 9-14, 2008, pp. 135-145.
Park, S., et al., "Ctrigger: Exposing Atomicity Violation Bugs from their Hiding Places", In Proceedings of the 14th International Conference on Architectural Support for Programming Languages and Operating Systems (ASPLOS XIV '09): Washington, DC, USA, Mar. 7-11, 2009, pp. 25-36.
Park, S., et al., "Pres: Probabilistic Replay with Execution Sketching on Multiprocessors", In Proceedings of the 22nd ACM Symposium on Operating Systems Principles (SOSP '09), Big Sky, MT, USA, Oct. 11-14, 2009, pp. 177-192.
Perkins, J.H., et al., "Automatically Patching Errors in Deployed Software", In Proceedings of the 22nd ACM Symposium on Operating Sytems Principles (SOSP '09), Big Sky, MT, USA, Oct. 11-14, 2009, pp. 87-102.
Provos, N., "Improving Host Security with System Call Policies", In Proceedings of the 12th USENIX Security Symposium (SSYM '03), Washington, DC, USA, Aug. 4-8, 2003, pp. 257-272.
Qin, F., et al., "Rx: Treating Bugs as Allergies—A Safe Method to Survive Software Failures", In Proceedings of the 20th ACM Symposium on Operating Systems Principles (SOSP '05), Brighton, UK, Oct. 23-26, 2005, pp. 235-248.
Ranger, C., et al., "Evaluating: MapReduce for Multi-Core and Multiprocessor Systems", In Proceedings of the 13th International Symposium on High Performance Computer Architecture (HPCA '07), Phoenix, AZ, USA, Feb. 10-14, 2007, pp. 13-24.
Rinard, M., et al. "Enhancing Server Availability and Security Through Failure-Oblivious Computing", In Proceedings 6th Symposium on Operating Systems Design and Implementation (OSDI '04), San Francisco, CA, USA, Dec. 6-8, 2004, pp. 303-316.
Rinard, M., et al., "A Dynamic Technique for Eliminating Buffer Overflow Vulnerabilities (and Other Memory Errors)", In Proceedings 20th Annual Computer Security Applications Conference (ACSAC '04), Tucson, AZ, USA, Dec. 6-10, 2004, pp, 82-90.
Rinard, M.C., "Acceptability-Oriented Computing", In Companion of the 18th Annual ACM SIGPLAN Conference on Object-Oriented Programming, Systems, Languages, and Applications (OOPSLA '03), Anaheim: CA, USA, Oct. 26-30, 2003, pp. 221-239.
Rudys, A. and Wallach, D.S., "Termination in Language-Based Systems", In ACM Transactions on Information and System Security (TISSEC '02), vol. 5, No. 2, May 2002, pp. 138-168.
Rudys, A. and Wallach, D.S., "Transactional Rollback for Language-Based Systems", In Proceedings of the International Conference on Dependable Systems and Networks (DSN '02), Bethesda, MD, USA, Jun. 23-26, 2002, pp. 439-448.
Saltzer, J.H., et al., "End-to-End Arguments System Design", In ACM Transactions on Computer Systems, vol, 2, No. 4, Nov. 1984, pp. 277-288.
Savage, S., et al., "Eraser: A Dynamic Data Race Detector for Multithreaded Programming", In ACM Transactions on Computer Systems (TOCS), vol. 15, No. 4, Nov. 1997, pp. 391-411.
Schultz, M., et al., "Scalable Dynamic Binary Instrumentation for Blue Gene/L", In Computer Architecture News (SIGARCH), vol. 33, No. 5, Dec. 2005, pp. 9-14.
Sen, K., "Race Directed Random Testing of Concurrent Programs", In Proceedings of the ACM SIGPLAN 2008 Conference on Programming Language Design and Implementation (PLDI '08), Tucson, AZ, USA, Jun. 7-13, 2008, pp. 11-21.
Sen, K., et al., "CUTE: A Concolic Unit Testing Engine for C", In Proceedings of the 10th European Software Engineering Conference (ESEC '05), Lisbon, PT, Sep. 5-9, 2005, pp. 263-272.
Sengupta, R., et al., "Software Fault Tolerance for Low to Moderate Radiation Environments", In Proceedings of the Conference on Astronomical Data Analysis Software and Systems X, vol. 238, 2001.
Shankar, U., et al., "Detecting Format String Vulnerabilites with Type Quailfiers", In Proceedings of the 10th USENIX Security Symposium (SSYM '01), Washington, DC, USA, Aug. 13-17, 2001, pp. 201-216.
Sidiroglou, S. and Keromytis, A.D., "A Network Worm Vaccine Architecture", In Proceedings of the Twelfth IEEE International Workshops on Enabling Technologies: Infrastructure for Collaborative Enterprises (WETICE '03), Workshop on Enterprise Security, Linz, AT, Jun. 9-11, 2003, pp. 220-225.
Sidiroglou, S., et al. "Building a Reactive Immune System for Software Services", In Proceedings of the 2005 USENIX Annual Technical Conference (USENIX '05), Anaheim, CA, USA, Apr. 10-15, 2005, pp. 149-161.
Sidiroglou, S., et al., "A Dynamic Mechanism for Recovering from Buffer Overflow Attacks", In Proceedings of the 8th Information Security Conference (ISC '05), Singapore, Sep. 20-23, 2005, pp. 1-15.
Sidiroglou, S., et al., "ASSURE: Automatic Software Self-Healing using Rescue Points", In Proceedings of the 14th International Conference on Architectural Support for Programming Languages and Operating Systems (ASPLOS XIV '09), Washington, DC, USA, Mar. 7-11, 2009, pp. 37-48.
Singh, J.P., et al., "SPLASH: Stanford Parallel Applications for Shared-Memory", Technical Report No. CSL-TR-91-469, Stanford University, Apr. 1991.
Soules, C.A.N., et al., "System Support for Online Reconfiguration", White Paper, Nov. 2002, available at: http://web.archive.org/web/20060316175544/http://www.research.ibm.com/k42/papers/auto-res.pdf.
Srinivasan, S.M., et al., "Flashback: A Lightweight Extension for Rollback and Deterministic Replay for Software Debugging", In Proceedings of the USENIX Annual Technical Conference (USENIX '04), Boston, MA, USA, Jun. 27-Jul. 2, 2004, pp. 29-44.
Srivastava, A. and Eustace, A., "Atom—A System for Buiiding Customized Program Analysis Tools", In Proceedings of the ACM SIGPLAN 1994 Conference on Programming Language Design and Implementation (PLDI '94), Orlando, FL, USA, Jun. 20-24, 1994, pp. 196-205.
Subramanian, S., et al., "Dynamic Software Updates: A VM-centric Approach", In Proceedings of the 2009 ACM SIGPLAN Conference on Programming Language Design and Implementation (PLDI '09), Dublin, IE, Jun. 15-21, 2009, pp. 1-12.

(56) References Cited

OTHER PUBLICATIONS

Sun, Y., et al., "MT-Scribe: A Tool for Recording and Inferring Model Transformations", In Companion to the 24th Annual ACM SIGPLAN Conference on Object-Oriented Programming, Systems, Languages, and Applications (OOPSLA '09), Orlando, FL, USA, Oct. 25-29, 2009, pp. 815-816.
Thies, W., et al., "Streamit: A Language for Streaming Applications", In Proceedings of the 11th International Conference on Compiler Construction (CC '02), Grenoble, FR, Apr. 8-12, 2002, pp. 179-196.
U.S. Appl. No. 13/190,316, filed Jul. 25, 2011.
U.S. Appl. No. 60/810,033, filed May 31, 2006.
U.S. Appl. No. 61/366,900, filed Jul. 22, 2010.
U.S. Appl. No. 61/367,357, filed Jul. 23, 2010.
Vasudevan, N. and Edwards, S.A., "Celling SHIM: Compiling Deterministic Concurrency to a Heterogeneous Muiticore" In Proceedings of the 2009 ACM Symposium on Applied Computing (SAC '09), Honolulu, HI, USA, Mar. 8-12, 2009, pp. 1626-1631.
Wagner, R.A. and Fischer, M.J., "The String-to-String Correction Problem", In Journal of the ACM, vol. 21, No. 1, Jan. 1974, pp. 168-173.
Wang, N.J., et at., "Y-Branches: When You Come to a Fork in the Road, Take It", In Proceedings of the 12th International Conference on Parallel Architectures and Compilation Techniques (PACT '03), New Orleans, LA, USA, Sep. 27-Oct. 1, 2003, pp. 56-66.
Wang, Y., et al., "Gadara: Dynamic Deadlock Avoidance for Multithreaded Programs", In Proceedings of the 8th USENIX Symposium on Operating Systems Design and Implementation (OSDI '08), San Diego, CA, USA, Dec. 8-10, 2008, pp. 281-294.
Written Opinion in International Patent Application No. PCT/US2007/012784, filed May 31, 2007, mailed Jul. 14, 2008.
Yang, J., et al., "Automatically Generating Malicious Disks using Symbolic Execution", In Proceedings of the IEEE Symposium on Security & Privacy (S&P '06), Berkeley, CA, USA, May 21-24, 2006, pp. 243-257.
Yang, J., et al., "MODIST: Transparent Model Checking of Unmodified Distributed Systems", In Proceedings of the 6th USENIX Symposium on Networked Systems Design and Implementation, (NSDI '09), Boston, MA, USA, Apr. 22-24, 2009, pp. 213-228.
Yu, Y., et al., "Racetrack: Efficient Detection of Data Race Conditions via Adaptive Tracking", In Proceedings of the 20th ACM Symposium on Operating Systems Principles (SOSP '05), Brighton, UK, Oct. 23-26, 2005, pp. 221-234.
Zhang, W., et al., "ConMem: Detecting Severe Concurrency Bugs through an Effect-Oriented Approach", In Proceedings of the 15th International Conference on Architectural Support for Programming Languages and Operating Systems (ASPLOS-XV '10), Pittsburgh, PA, USA, Mar. 13-17, 2010, pp. 179-192.
"Ksplice", Ksplice.com, Jul. 19, 2011, pp. 1-10, available at: http://www.ksplice.com.
"VMWare Virtual Lab Automation", White Paper, VMWare.com, copyright 2006, last accessed Oct. 23, 2014, pp. 1-11, available at: http://www.vmware.com/pdf/virtual_lab_automation_whitepaper.pdf.
Adve, V., et al., "The LLVM Compiler", last updated Sep. 4, 2014, pp. 1-13, available at: http://www.llvm.org.
Aho, A. V., et al., "Compilers: Principles, Techniques, and Tools", 2nd Edition, Addison Wesley, Sep. 10, 2006, pp. 655-671.
Aichernig, B.K., et al., "Conformance Testing of Distributed Concurrent Systems with Executable Designs", In Proceedings of the 7th Symposium on Formal Methods for Components and Objects, Sophia Antipolis, FR, Oct. 21-23, 2008, pp. 61-81.
Ball, T. and Larus, J.R., "Branch Prediction for Free", In PLDI '93: Proceedings of the Conference on Programming Language Design and Implementation, Jun. 21-25, 1993, pp. 300-313.
Ball, T. and Larus, J.R., "Efficient path profiling", In MICRO 29: Proceedings of the 29th International Symposium on Microarchitecture, Dec. 2-4, 1996, pp. 46-57.
Blumofe, R.D., et al., "Cilk: an Efficient Multithreaded Runtime System" In Journal of Parallel and Distributed Computing, vol. 37, No. 1, Aug. 25, 1996, pp. 55-69.
Cui, A., et al., "Stable Deterministic Multithreading through Schedule Memoization", In Proceedings of the 9th Symposium on Operating Systems Design and Implementation, Oct. 2010, pp. 1-15.
Dey, A.S., et al., "Database Test Suite", SourceForge.net, Oct. 1, 2010, pp. 1-6, available at: http://sourceforge.net/projects/osdldbt/.
Fisher, J.A. and Freudenberger, S.M., "Predicting conditional branch directions from previous runs of a program", In Proceedings of the 5th International Conference on Architechtural Support for Programming Languages and Operating Systems, vol. 27, No. 9, Sep. 1992, pp. 85-95.
Kopytov, A., "SysBench: A System Performance Benchmark", Jul. 16, 2011, pp. 1-8, available at: http://sysbench.sourceforge.net.
Laadan, O., et al., "Transparent, Lightweight Application Execution Replay on Commodity Multiprocessor Operating Systems" In Proceedings of the International Conference on Measurement and Modeling of Computer Systems, Jun. 2010, pp. 155-166.
Lu, S., et al., "Bugbench: Benchmarks for Evaluating Bug Detection Tools", In Proceedings of the 1st Workshop on the Evaluation of Software Defect Detection Tools, Jun. 2005, pp. 1-5.
Ronsse, M., and De Bosschere, K., "Recplay: a Fully Integrated Practical Record/Replay Systems", In ACM Transactions on Computer Systems, vol. 17, No. 2, May 1999, pp. 133-152.
Russinovich et al., "Replay for Concurrent Non-deterministic Shared-Memory Applications", In Proceedings of the ACM SIGPLAN Conference on Programming Language Design and Implementation, May 21-24, 1996, Philadelphia, PA, USA, pp. 258-266.
The Apache Software Foundation, "Apache HTTP server benchmarking tool", Apache.org, last accessed Nov. 7, 2014, pp. 1-5, available at: http://httpd.apache.org/docs/2.2/programs/ab.html.
University of Maryland, "Dynamic Software Updating", UMD.edu, Aug. 15, 2010, pp. 1, available at: http://www.cs.umd.edu/projects/PL/dsu/.
Ziarek, L., et al., "Partial Memoization of Concurrency and Communication", In Proceedings of the 14th International Conference on Functional Programming, Edinburgh, SC, Aug. 31-Sep. 2, 2009, pp. 161-172.
Office Action dated Jan. 27, 2015 in U.S. Appl. No. 13/190,316.

\* cited by examiner

```
1 ://log.cc. thread T1              1 ://sql_insert.cc. thread T2
2 :void MYSQL_LOG::new_file(){       2 ://[race] may return false
3 : lock(&LOCK_log);                 3 :if (mysql_bin_log.is_open()){
4 : ...                              4 : lock(&LOCK_log);
5 : close(); // log is closed        5 : if (mysql_bin_log.is_open()){
6 : open(...);                       6 :   ... // write to log
7 : ...                              7 : }
8 : unlock(&LOCK_log);               8 : unlock(&LOCK_log);
9 :}                                 9 :}
```

FIG. 2

```
// Execution filter 1: unilateral exclusion
{log.cc:5, log.cc:6} <> *

// Execution filter 2: mutual exclusion of code
{log.cc:5, log.cc:6} <> MYSQL_LOG::is_open // Execution filter 3: mutual exclusion of code and data
{log.cc:5 (this), log.cc:6 (this)} <> MYSQL_LOG::is_open(this)
```

302 — Execution filter 1
304 — Execution filter 2
306 — Execution filter 3

FIG. 3

```
 1 : // database worker thread
 2 : void handle_client(int fd) {
 3 :   for(;;) {
 4 :     struct client_req req;
 5 :     int ret = recv(fd, &req, ....);
 6 :     if(ret <= 0) break;
 7 :     open_table(req.table_id);
 8 :     ... // do real work
 9 :     close_table(req.table_id);
10:   }
11: }
12: void open_table(int table_id) {
13:   // fix: acquire table lock
14:   ... // actual code to open table
15: }
16: void close_table(int table_id) {
17:   ... // actual code to close table
18:   // fix: release table lock
19: }
```

FIG. 8

```
// inserted at CFG cycle
void cycle_check() {
    if(wait[stmt_id]) {
        read_unlock(&update);
        while(wait[stmt_id]);
        read_lock(&update);
    }
}

// inserted before blocking call
void before_blocking() {
    atomic_inc(counter[callsite_id]);
    read_unlock(&update);
}

// inserted after blocking call
void after_blocking() {
    read_lock(&update);
    atomic_dec(counter[callsite_id]);
}
```

1102 → (cycle_check)
1104 → (before_blocking)
1106 → (after_blocking)

FIG. 11

```
void slot(int stmt_id) {
    op_list = operations[stmt_id];
    foreach op in op_list
        do op;
}
```

METHODS, SYSTEMS, AND MEDIA FOR PROTECTING APPLICATIONS FROM RACES

CROSS REFERENCE TO RELATED APPLICATION

This application claims the benefit of U.S. Provisional Patent Application No. 61/366,900, filed Jul. 22, 2010, which is hereby incorporated by reference herein in its entirety.

STATEMENT REGARDING FEDERALLY SPONSORED RESEARCH OR DEVELOPMENT

This invention was made with government support under CNS-1012633 and CNS-0905246 awarded by the National Science Foundation, and under FA8650-10-C-7024 and FA8750-10-2-0253 awarded by the Air Force Research Lab. The government has certain rights in the invention.

TECHNICAL FIELD

This application relates to methods, systems, and media for protecting applications from races.

BACKGROUND

Deployed multithreaded applications can contain many races because these applications are difficult to write, test, and debug. These races include data races, atomicity violations, order violations, and any other concurrency errors. They can cause application crashes and data corruptions. Worse, the number of deployed races may drastically increase due to the popularity of multicore and the immaturity of race detectors.

To address such races, software updates are typically employed. A problem with such updates, however, is that they typically require an application restart, and thus are at odds with high availability demand. Live update systems are also used to address races. Such systems allow a user to avoid a restart by adapting conventional patches into hot patches and applying them to live applications or kernels.

However, a reliance on conventional patches can have two problems. First, due to the complexity of multithreaded applications, race-fix patches can be unsafe and introduce new errors such as new races or deadlocks. Safety is crucial for encouraging users to adopt live updates and install fixes early, yet automatically ensuring safety is difficult because conventional patches are created from general, difficult-to-analyze languages. Second, even if the root cause of a race is reasonably clear, producing a good patch for the race can still take time, leaving buggy applications unprotected before the patch is ready. Many factors contribute to the delays. At a minimum level, a public software release demands time-consuming code review and testing, which contribute to the delays between fix and release. Moreover, despite the many available options for fixing a race (e.g., lock-free flags, fine-grained locks, and coarse-grained locks), conventional patches often have to be reasonably efficient for source maintainers to accept them, contributing to the delays between diagnosis and fix. Performance pressure is perhaps why many races have not been fixed by adding locks, and why some have taken years to correctly fix.

SUMMARY

Methods, systems, and media for protecting applications from races are provided. In some embodiments, methods for protecting applications from races are provided, the methods comprising: adding to at least one cycle of the application an update check to determine when an update to the application is to be made; adding an update engine to the application, wherein the update engine is configured to: receive an update plan that is based on an execution filter that specifies how operations of the application are to be synchronized; and cause synchronization operations to be added to the application based on the update plan that prevent the race from occurring.

In some embodiments, methods for protecting applications from races are provided, the methods comprising: executing in at least one cycle of the application an update check to determine when an update to the application is to be made; receiving an update plan that is based on an execution filter that specifies how operations of the application are to be synchronized; and performing synchronization operations based on the update plan that prevent the race from occurring.

In some embodiments, methods for protecting applications from races are provided, the methods comprising: creating an execution filter that specifies how operations of an application are to be synchronized; generating an update plan that is based on the execution filter; and causing synchronization operations to be performed at the application based on the update plan that prevent the race from occurring.

BRIEF DESCRIPTION OF THE DRAWINGS

FIG. 2 shows an example of a race that can be addressed in accordance with some embodiments.

FIG. 3 shows an example of execution filters in accordance with some embodiments.

FIG. 8 shows an example of a thread that can cause an inconsistency scenario in accordance with some embodiments.

FIG. 11 shows an example of pseudo code of instrumentation code for checking for updates in accordance with some embodiments.

FIG. 12 shows examples of pseudo code of a slot function and functions for managing blocking calls in accordance with some embodiments.

DETAILED DESCRIPTION

Methods, systems, and media for protecting application from races are provided.

In accordance with some embodiments, mechanisms for apply synchronization controls that address race conditions in multi-threaded applications are provided. In accordance with some embodiments, to use such mechanisms, an application is first compiled to gather information about the application and to include an update engine and the necessary instrumentation or modifications to facilitate the synchronization controls. At runtime, to work-around a race, an execution filter can be written that synchronizes portions of the application to filter out racy thread interleavings. These filters can be kept separate from the source code for the application. The filter can then be downloaded and installed into the application without restart to protect the application from the race.

In some embodiments, the mechanisms disclosed herein can be used for a variety of purposes. For example, in some embodiments, some conventional patches can be converted into execution filters and can be installed into live applications. As another example, in some embodiments, before a permanent fix (i.e., a correct source patch) is available, an execution filter can be created as a temporary fix to a race to provide more-immediate protection to highly critical applications. As yet another example, in some embodiments, when a potential race is reported (e.g., by automated race detection tools or users of an application), a filter can be installed to prevent the race suspect. Later, if the race suspect is diagnosed to be false or benign, the filter can be removed. As still yet another example, in some embodiments, users can write and share filters with other users. As still yet another example, in some embodiments, execution filters can be selected for installation or not on a site-by-site (or machine-by-machine) basis based on a site's (or machine's) ability to afford the filter (which can be based on monetary cost, processing time cost, etc.). As still yet another example, in some embodiments, execution filters can be used to demonstrate a race by forcing a corresponding racy thread interleaving. As still yet another example, in some embodiments, using execution filters, "concurrency" test cases can be constructed and used to test applications.

Figure 1:
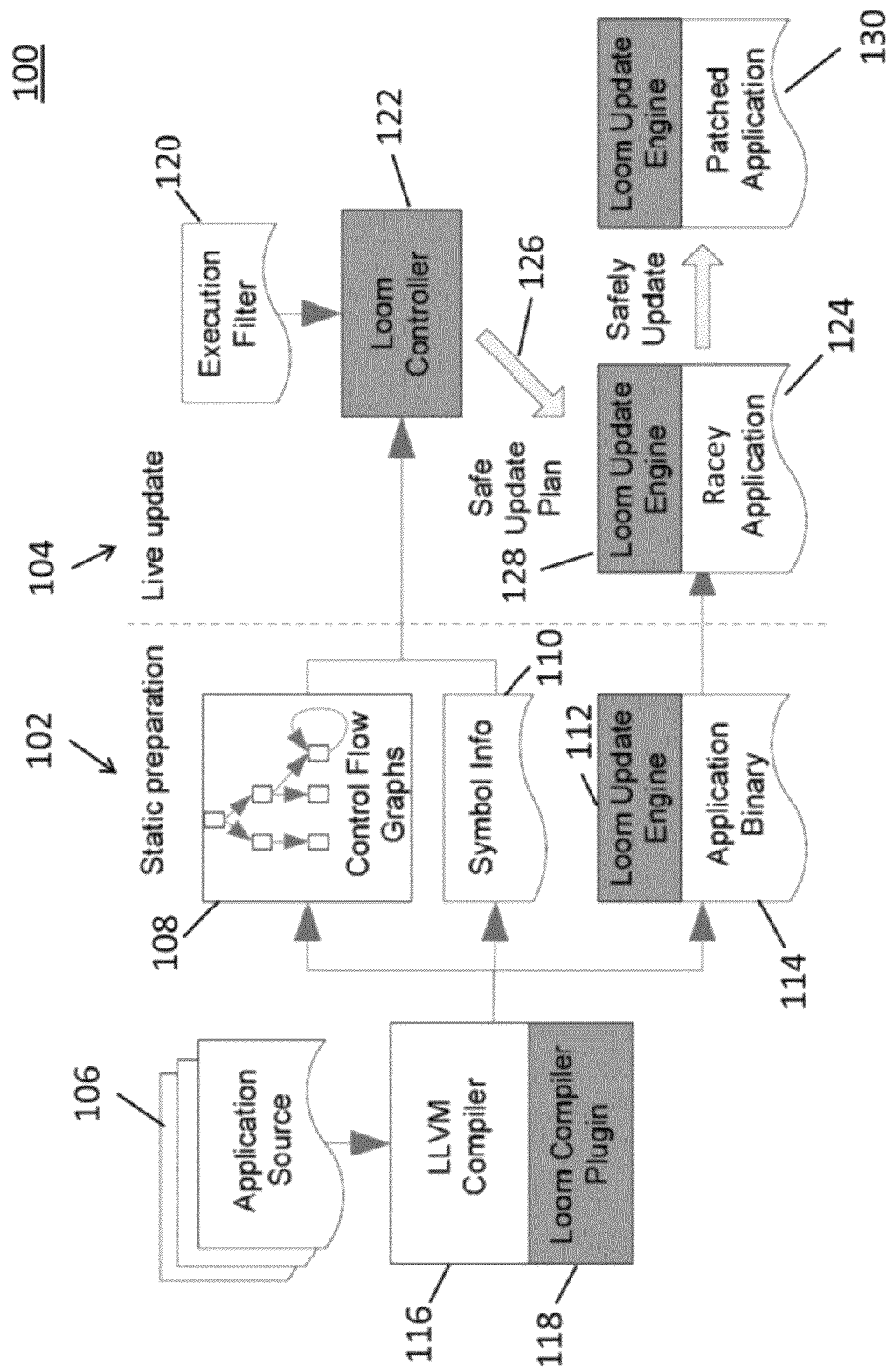
FIG. 1 is an overview diagram of an example mechanism for addressing races in accordance with some embodiments.

FIG. 1 presents an overview of a mechanism 100 for addressing races in accordance with some embodiments. To use mechanism 100 for addressing races, in some embodiments, an application 106 is first statically prepared during compilation at 102. This compilation and preparation can be performed on a compiler device, such as, for example, a general purpose computer or a server, and can use and create data, source code, object code, application binaries, etc. stored on a storage device, and can be performed by a compiler, such as, for example, the LLVM compiler 116 (or any other suitable compiler) with a plug-in 118 (although the plug-in functionality could additionally or alternatively be incorporated into the compiler), in some embodiments. For example, in some embodiments, this preparation can collect and store control flow graphs (CFG) 108 and symbol information 110 of the application so that these can later be used by a live-update process 104. The compilation and preparation can also add an update engine 112 to the application binary 114 of the application in some embodiments.

The application binary and update engine can then be run on any suitable user device in some embodiments.

Later, to fix a race, an execution filter 120 in a suitable filter language can be written and distributed for installation at the application. Any suitable mechanism for writing and distributing the filter can be used in some embodiments. The filter can then be installed to protect the application. Any suitable mechanism for installing the filter can be used in some embodiments. For example, in some embodiments, a filter can be installed by running the following command:

% loomctl add <pid> <filter-file>

In this command, "loomctl" can be a user-space controller program 122 that interacts with users and initiates live update sessions, "pid" can denote the process ID of an application instance 124 with a race condition, and "filter-file" can be a file containing execution filter 120. Controller 122 can then compile the execution filter down to a safe update plan 126 using CFGs 108 and symbol information 110. This update plan can include three parts: (1) synchronization operations to enforce the constraints described in the filter and information indicating where in the application to add the operations; (2) safety pre-conditions that must hold for installing the filter; and (3) error checking code to detect potential errors in the filter. The controller can then send the update plan to an update engine 128 (which can be running as a thread inside the application's address space), which can then monitor the runtime states of the application and carry out the update plan only when all the safety preconditions are satisfied to produce a patched application 130.

If a problem with a filter is detected through an error check, the filter can automatically be removed from the application in some embodiments. When the filter is to be removed, the live update process can wait for any needed safety preconditions to be met before removing the filter.

In some embodiments, a user can also remove a filter manually. This may be desirable if, for example, a race that a filter intends to fix turns out to be benign. For example, in some embodiments, a user can remove a filter by running the following Linux commands:

% loomctl ls <pid>
    % loomctl remove <pid> <filter-id>

The first of these commands ("loomctl ls") can be used to return a list of installed filter IDs within a given process "pid". The second of these commands ("loomctl remove") can be used to remove a filter identified by "filter-id" from the process identified by "pid".

In some embodiments, an installed filter can be replaced with a new filter. For example, this may be desirable when, for example, the new filter fixes the same race but has less performance overhead. This can be done in some embodiments using the following Linux command:

% loomctl replace <pid> <old-id> <new-file> where "pid" is the ID of a process containing an installed filter, "old-id" is the ID of the installed filter, and "new-file" is a file containing a new filter.

In order to remove or update an execution filter, the update controller can create a corresponding update plan and send the update plan to the update engine for execution against the application.

Turning to FIGS. 2-5, two examples of application races and execution filters that can be used to fix them in accordance with some embodiments are described.

In the first example, shown in FIG. 2, a race in MySQL causes the MySQL on-disk transaction log to miss records. The code on the left 202 of FIG. 2 (function new file( )) rotates MySQL's transaction log file by closing the current log file and opening a new one. This code is called when the transaction log has to be flushed. The code on the right 204 of FIG. 2 is used by MySQL to append a record to the transaction log. It uses double-checked locking and writes to the log only when the log is open. A race occurs if "is_open( )" (T2, line 3 206) catches a closed log when thread T1 202 is between "close( )" (T1, line 5 208) and "open( )" T1, line 6 210).

FIG. 3 shows examples of several execution filters that can be used to fix the race illustrated in connection with FIG. 2. As shown, execution filter 1 302 is the most conservative of the three filters and makes the code region between T1, line 5 and T1, line 6 atomic against all code regions, so that when a thread executes this region, all other threads must pause. This synchronization constraint can be referred to as a unilateral exclusion in contrast to a mutual exclusion that requires that participating threads agree on the same lock. In this example, the operator "<>" expresses a mutual exclusion constraint, its first operand "{log.cc:5, log.cc:6}" specifies a code region to protect, and its second operand "*" represents all code regions.

Execution filter 2 304 reduces overhead by refining the "*" operand to a specific code region, function "MYSQL LOG::is open( )" This filter makes the two code regions mutually exclusive, regardless of what memory locations they access.

Execution filter 3 306 further improves performance by specifying the memory location accessed by each code region.

Figure 4:
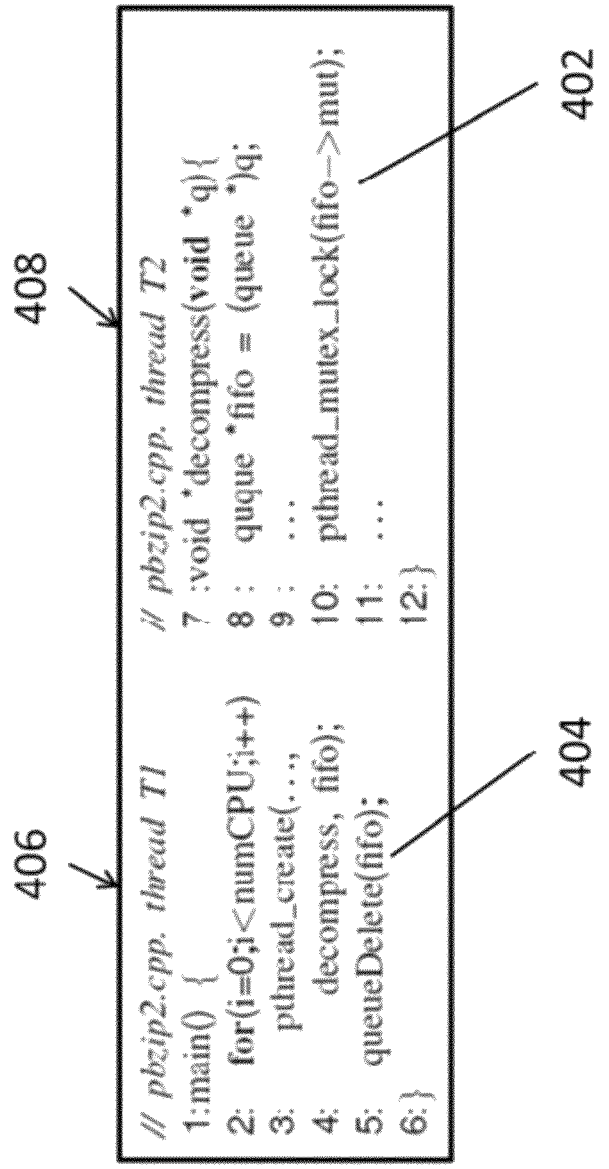
FIG. 4 shows another example of a race that can be addressed in accordance with some embodiments.
Figure 5:
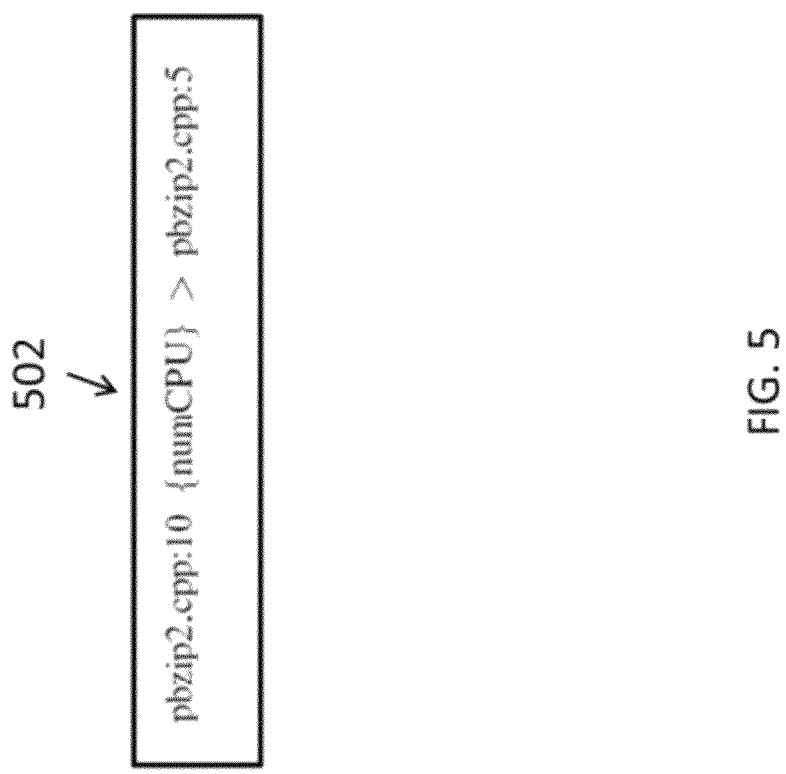
FIG. 5 shows another example of an execution filter in accordance with some embodiments.

In the second example of an application race, shown in FIG. 4, a race causes PBZip2 to crash due to a use-after-free error. The crash occurs when "fifo" 402 is de-referenced (line 10) after it is freed 404 (line 5). The root cause of this crash is that the "main( )" thread 406 on the left of FIG. 4 does not wait for the "decompress( )" thread 408 on the right of FIG. 4 to finish. To fix this race, a filter 502, such as that shown in FIG. 5, which requires that line 5 of PBZip2 pseudo-code must not run (and thus wait if need be) before "numCPU" times after line 10 of PBZip2 pseudo-code runs.

Figure 6:
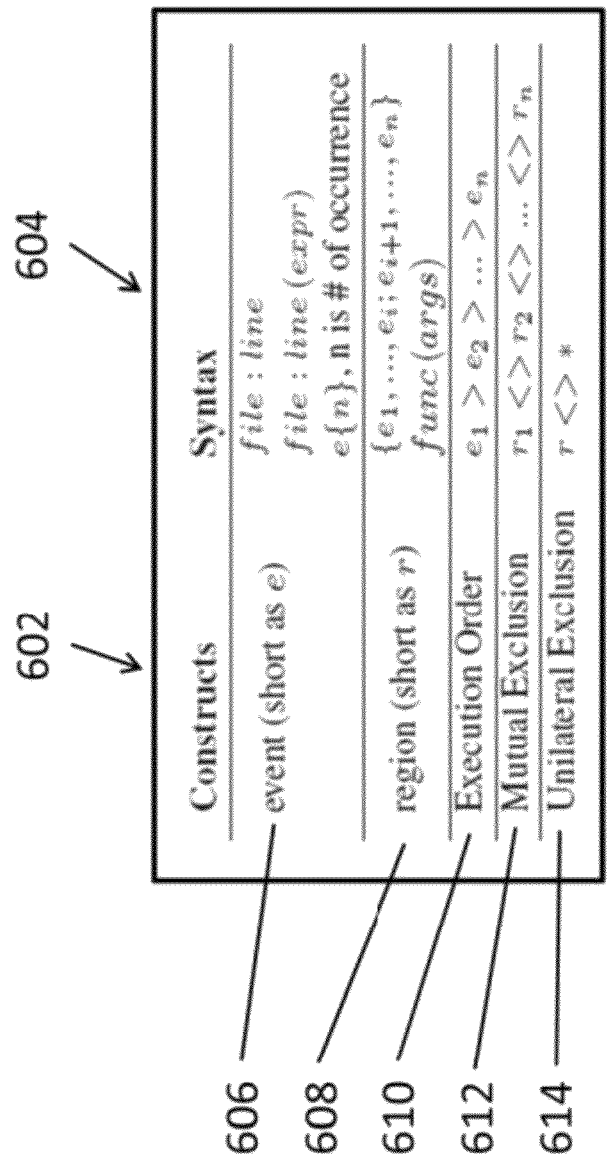
FIG. 6 shows examples of constructs and syntax for an execution filter language in accordance with some embodiments.

FIG. 6 gives examples of constructs 602 and syntax 604 for an execution filter language in accordance with some embodiments. As shown, these filters can express synchronization constraints on events 606 and regions 608. For example, a filter can express a synchronization constraint on a dynamic instance of a static program statement (an event), identified by file name and line number, using the syntax "file: line".

As another example, a filter can express a synchronization constraint on such an event by "file: line," and an additional "(expr)" component and/or an "{n}" component, where "expr" can be used to identify different dynamic instances of program statements to be synchronized and "n" can be used to specify the number of occurrences of an event.

As still another example, a filter can express a synchronization constraint on a dynamic instance of a static code region identified by a set of entry and exit events or an application function. As a still further example, a filter can express a synchronization constraint on such a region representing a function call using an additional "(args)" component to distinguish different calls to the same function.

In some embodiments, a synchronization constraint can be an execution order constraint, a mutual exclusion constraint, or a unilateral exclusion constraint. As illustrated in FIG. 6, an execution order constraint 610 in some embodiments can be used to make an event $e_1$ happen before an event $e_2$ using the syntax "$e_1>e_2$", an event $e_2$ happen before an event $e_3$ using the syntax "$e_2>e_3$", and so forth. In order to effect such a constraint of "$e_i>e_{i+1}$", for example, a semaphore up( ) operation can be inserted at $e_i$ and a semaphore down( ) operation can be inserted at $e_{i+1}$.

A mutual exclusion constraint 612 in some embodiments can be used to make pairs of code regions $r_i$ and $r_j$ mutually exclusive with each other using the syntax "$r_i<>r_j$". In order to effect such a constraint of "$r_i<>r_j$," a lock( ) can be created and inserted at each region entry and an unlock( ) can be created and inserted at each region exit.

A unilateral exclusion constraint 614 in some embodiments can be used to make the execution of a code region r single-threaded using the syntax "$r<>*$". In order to effect such a constraint "$r<>*$", non-r regions executing at the same time as region r can be paused at safe locations and resumed when the execution of region r has completed. For example, an evacuation mechanism as described below can be used for this purpose in some embodiments.

In some embodiments, locks and semaphores for the constraints can be created on demand. For example, the first time a lock or semaphore is referenced, the lock or semaphore can be created based the ID of the filter, the ID of the constraint, and the value of "expr" if present. In some embodiments, locks can be initialized to an unlocked state. In some embodiments, semaphores can be initialized to 0 or n−1 if {n}, the number of occurrences, is specified. In some embodiments, the values of "expr" and "n" can be calculated using debugging symbol information.

In some embodiments, to increase safety, additional error checking code can be inserted into an application as part of an update plan. For example, given a code region c in a mutual exclusion constraint, such error checking code can check for errors such as an unlock( ) for region c releasing a lock not acquired by a lock( ) for region c—i.e., a deadlock. More particularly, error checking can check for such a deadlock by determining if a filter causes a thread to stall for too long. In the event that such a deadlock is detected, the filter can be uninstall by breaking this synchronization variable in some embodiments.

Figure 7:
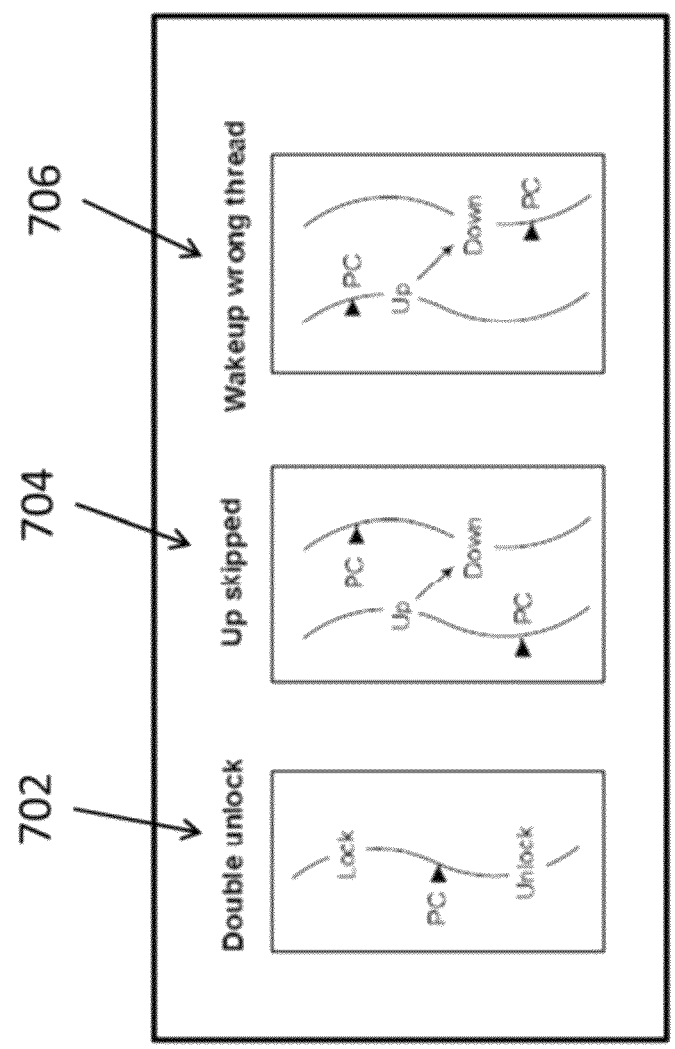
FIG. 7 shows examples of inconsistency scenarios that can be addressed in accordance with some embodiments.

Turning to FIG. 7, three examples of inconsistency scenarios 702, 704, and 706 that can be handled in some embodiments are illustrated. As shown, for a mutual exclusion constraint filter on two or more code regions, a filter installation process can ensure that no thread is executing within any of the code regions when installing the filter to avoid double-unlock errors (as illustrated by 702 of FIG. 7) that can occur.

Similarly, for an execution order constraint filter "$e_1>e_2$", a filter installation process can ensure either of the following two conditions when installing the filter: (1) both $e_1$ and $e_2$ have occurred; or (2) neither event has occurred. In this way, the process can prevent an "up( )" inserted at event $e_1$ from getting skipped (as illustrated by 704 of FIG. 7) or waking up a wrong thread (as illustrated by 706 of FIG. 7).

A more particular example of an inconsistency scenario is illustrated in the contrived database worker thread code of FIG. 8. As shown, a function process client( ) 802 is the main thread function and takes a client socket as input and repeatedly processes requests from the socket in a loop. For each such request, function process client( ) opens the corresponding database table by calling open_table( ) 804, serves the request, and closes the table by calling close_table( ) 804. A race occurs in this code when multiple clients concurrently access the same table.

Figure 9:
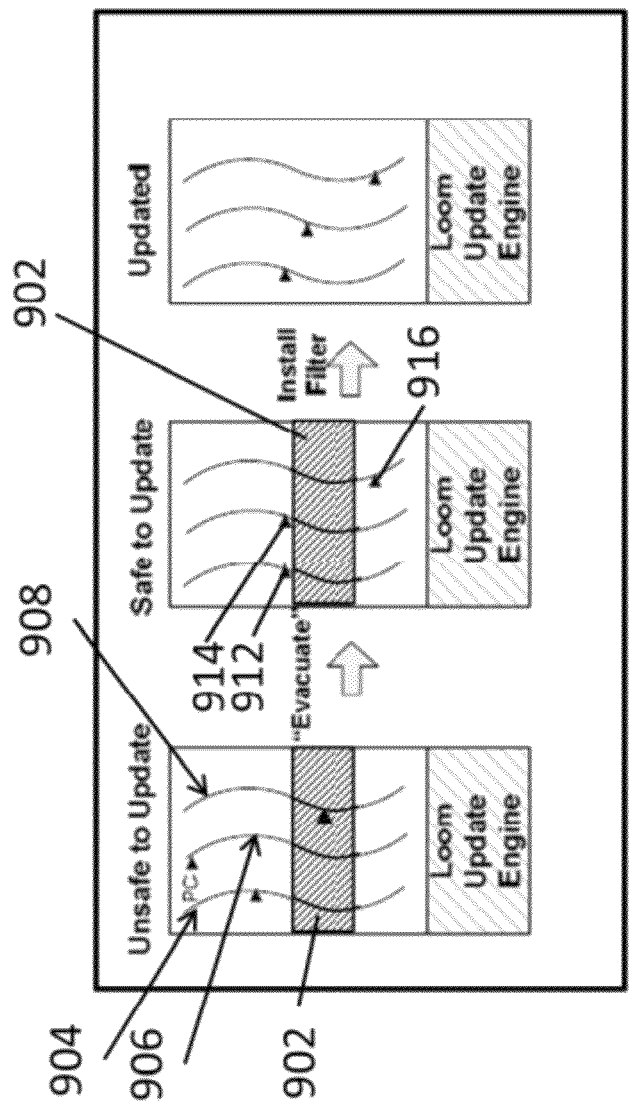
FIG. 9 shows an example of a process for identifying unsafe locations to block a thread, blocking a thread, and updating an application in accordance with some embodiments.

To fix this race, an execution filter can add a lock acquisition at line 13 808 in open_table( ) and a lock release at line 18 810 in close_table( ) in some embodiments. To safely install this filter, an evacuation mechanism can be used to quiesce code regions in some embodiments. This can be accomplished, for example, by identifying a set of unsafe program locations in running threads that may interfere with the filter, blocking those threads from running when they are not in an unsafe location, installing the filter when the threads are blocked, and then resuming the threads. For example, as illustrated in FIG. 9, such a mechanism can identify unsafe locations 902 in threads 906, 908, and 910, block those threads when the program counters 912, 914, and 916 for each of the threads are outside of locations 902, install the filter when the threads are blocked, and then resume the threads.

Figure 10:
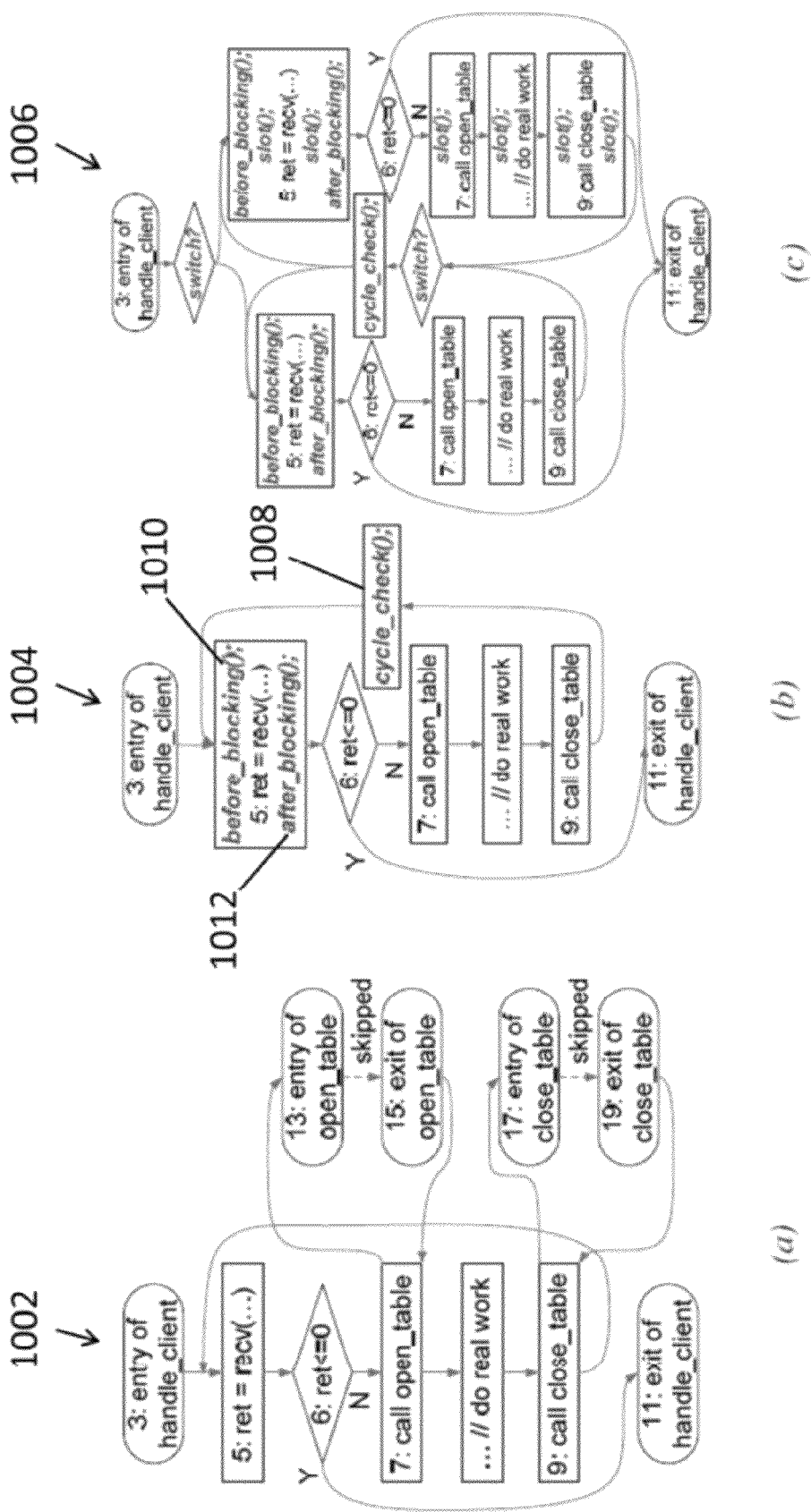
FIG. 10 shows examples of (a) an interprocedural control flow graph (TUG), (b) cycle checks and preventing blocking calls from blocking updates, and (c) slot function calls and hot backup switching in accordance with some embodiments.

To compute unsafe program locations for a mutual exclusion constraint, a static reachability analysis can be performed on the interprocedural control flow graph (ICFG) of an application in some embodiments. An ICFG connects each function's control flow graphs by following function calls and returns. FIG. 10(a) shows an example of an ICFG 1002 for the code in FIG. 8 in accordance with some embodiments. This static reachability analysis can first determine whether one statement can reach another statement. For example, statement $s_1$ reaches statement $s_2$ (which can be stated as "reachable($s_1$, $s_2$)" is true) if there is a path from $s_1$ to $s_2$ on the ICFG. For example, the statement at line 13 reaches the statement at line 8 in FIG. 8. Next, given an execution filter f with mutual exclusion constraint $r_1 < > r_2 < > \ldots < > r_n$, any statement s where "reachable($r_i$.entries, s)^ reachable(s, $r_i$.exits)" is true for i=1 ... n can be considered to be in an unsafe location, where $r_i$.entries is/are the entry statement(s) to region $r_i$ and $r_i$.exits is/are the exit statement(s) from exit region $r_i$.

Any suitable technique for computing unsafe program locations for an execution order constraint can be used in some embodiments. For example, for a constraint $e_1 > e_2 > \ldots > e_n$, unsafe program locations can be identified by first identifying all statements $s_d$ that dominate any $e_i$ (i.e., $s_d$ is on every path from the program start to $e_i$), wherein i=1 ... n, and then determining as unsafe any statements in any region between an $s_d$ and a corresponding $e_i$.

Since $e_i$ may be in different threads, the ICFG of an application can be augmented into a thread interprocedural control flow graph (TICFG) by adding edges for thread creation and join statements in accordance with some embodiments. A TICFG can be constructed by treating each "pthread_create (func)" statement as a function call to func( ) by adding an edge to the ICFG from the "pthread_create(func)" statement to the entry of func( ), and by adding a thread join edge to the ICFG from the exit of func( ) to the statement.

In some embodiments, in order to update application threads, the threads can be paused and resumed using a read-write lock (which can be referred to as an update lock). To update an application, the update engine can grab this lock in write mode, perform the update, and release the lock. To control application threads, the application can be instrumented so that the application threads hold this lock in read mode in normal operation and checks for update once in a while by releasing and re-grabbing this lock.

In some embodiments, update-checks can be placed inside an application to ensure timely update while not unduly increasing overhead. For example, in some embodiments, at least one update-check for each cycle in the control flow graph, including loops and recursive function call chains, can be placed so that an application thread cycling in one of these cycles can check for update at least once each iteration. More particularly, for example, the backedge of a loop and an arbitrary function entry in a recursive function cycle can be modified to include an update check. An example of this is shown by the call to "cycle_check( )" 1008 in 1004 of FIG. 10(b) in accordance with some embodiments.

In some embodiments, a wait flag can be assigned for each backedge of a loop and the chosen function entry of a recursive call cycle to ensure that application threads pause at safe locations. To enable/disable pausing at a safe/unsafe location, a corresponding flag can be set/cleared. The instrumentation code for each CFG cycle (e.g., the "cycle_check( )" code) can then check for updates only when the corresponding wait flag is set. These wait flags allow application threads at unsafe program locations to run until they reach safe program locations, effectively evacuating the unsafe program locations.

FIG. 11 shows examples of pseudo code 1102 that can be used to perform a cycle check in accordance with some embodiments.

In some embodiments, an application can be configured to release an update lock before a blocking call and re-grab it after the blocking call, so that an application thread blocking on the call for long does not delay an update. For the example, in FIG. 8, an update can be performed despite some threads being blocked in recv( ). In some embodiments, only the "leaf-level" blocking calls are modified to prevent a call from preventing an update during the call. For example, if foo( ) calls bar( ) and bar( ) is blocking, the calls to bar( ) can be modified, but the calls to foo( ) might not be modified. Calls to external functions (i.e., functions for which no source code is available) can be automatically presumed to be blocking to save user annotation effort in some embodiments. An example of this is shown by the calls to "before_blocking( )" 1010 and "after_blocking( )" 1012 in 1001 of FIG. 10(b) in accordance with some embodiments.

In some embodiments, a counter can be assigned to each blocking callsite to track how many threads are at the callsites. The counters can then be examined for calls at unsafe program locations and if one of these counters is positive, one or more attempts to release the update lock, wait, and re-grab it can be made, so that the threads blocked at unsafe locations can wake up and advance to safe locations. If some of the counters are still positive, the current update session can be aborted and retried at a later point.

FIG. 11 shows examples of pseudo code 1104 and 1106 that can be called before blocking calls and after blocking calls, respectively, to implement a counter and blocking call unlocking in accordance with some embodiments.

In some embodiments, each program location can be modified to include a slot function which interprets updates to the program location at runtime. FIG. 12 shows an example of pseudo code 1202 for such a slot function in accordance with some embodiments. This function iterates though a list of synchronization operations assigned to current statement and performs each. To update a program location at runtime, the operation list for the corresponding slot function can be modified.

Inserting the slot function at every statement may incur high runtime overhead and hinder compiler optimization. Accordingly, in some embodiments, two versions of each basic block in the application binary, an original version that is optimized, and a hot backup that is un-optimized and padded for update, can be maintained. To update a basic block at runtime, the backup can be updated and the execution switched to the backup by flipping a switch flag. In some embodiments, only function entries and loop backedges are modified to check the switch flags because doing so for each basic block can be expensive. An example of such slot function calls and hot backup switching is shown in FIG. 10(c) in accordance with some embodiments.

Figure 13:
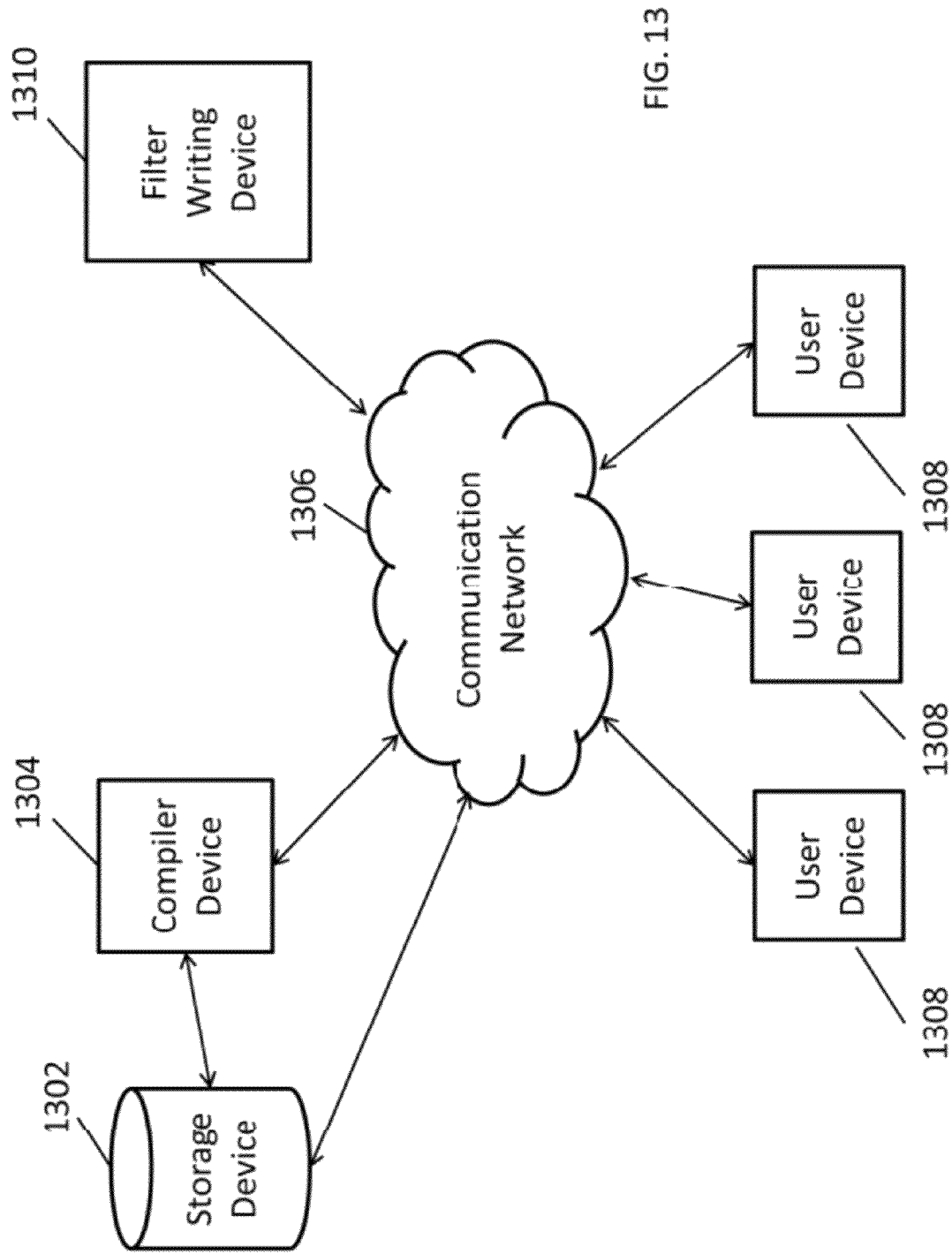
FIG. 13 shows an example of hardware that can be used in accordance with some embodiments.

FIG. 13 illustrates an example of hardware 1300 that can be used to implement some embodiments. As shown, hardware 1300 can include a storage device 1302, a compiler device 1304, a communication network 1306, user devices 1308, and a filter device 1310. Storage device 1302 can be any suitable device for storing software and/or data as described herein. For example, storage device 1302 can be a hard disk, a server, a network storage device, a memory device, etc. Compiler device 1304 can be any suitable device, such as a general purpose computer or server, for compiling, modifying, and/or instrumenting an application as described herein. For example, compiler device 1304 can include a compiler 116 and a compiler plugin 118 as described above in connection with FIG. 1. Communication network 1306 can be any suitable communication network for communicating applications, patches, execution filters, and/or any other suitable applications, parts of application, data, etc. Communication network 1306 can be any suitable one of or combination of the Internet, one or more local area networks, one or more wide area networks, one or more wireless networks, one or more wired networks, one or more satellite networks, one or more telephone networks, one or more cable television networks, etc. User devices 1308 can be any suitable devices for storing and running applications, execution filters, patches, etc. Filter writing device 1310 can be any suitable device for writing and/or storing execution filters and executing a controller program (such as controller program 122 of FIG. 1).

More particularly, for example, each of compiler device 1304, user devices 1308, and filter writing device 1310 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user devices 1308 can be implemented as a personal computer, a personal data assistant (PDA), a portable email device, a multimedia terminal, a mobile telephone, a smart phone, a tablet computer, a laptop, a portable media player, a set-top box, a streaming media player, a network appliance, a television, etc.

In some embodiments, any suitable computer readable media can be used for storing instructions for performing the processes described herein. Such computer readable media can be present in, attached to, and/or removable from storage device 1302, compiler device 1304, user devices 1308, and/or filter writing device 1310 in some embodiments. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for protecting an application from a race, comprising:
   adding to at least one cycle of the application an update check to determine when a software update to software of the application is to be made; and
   adding an update engine to the application, wherein the update engine is configured to:
      receive an update plan that is based on an execution filter that specifies how operations of the application are to be synchronized to filter out racy thread interleaving, wherein the execution filter is separated from source code of the application, and the execution filter can be downloaded and installed into the application to protect the application from the race during runtime without restart of the application, and wherein the update plan includes synchronization operations to enforce constraints described in the execution filter and information indicating where in the application to add the operations, and pre-conditions for installing the execution filter; and
      cause the synchronization operations to be added to the application as part of a software update based on the update plan that prevent the race from occurring.

2. The method of claim 1, further comprising adding a mechanism to prevent blocking calls from blocking updates.

3. The method of claim 1, further comprising adding at least one slot function that adds the synchronization operations to the application based on the update plan.

4. The method of claim 1, further comprising adding an instrumented copy of at least a part of the application that can be executed instead of the at least a part of the application in response to the update plan.

5. The method of claim 1, wherein the execution filter controls execution order of at least two portions of the application.

6. The method of claim 1, wherein the execution filter causes the execution of at least two portions of the application to be mutually exclusive.

7. The method of claim 1, wherein the execution filter causes a single portion of the application to be unilaterally executed.

8. A method for protecting an application from a race, comprising:
   executing in at least one cycle of the application an update check to determine when a software update to software of the application is to be made;
   receiving an update plan that is based on an execution filter that specifies how operations of the application are to be synchronized to filter out racy thread interleaving, wherein the execution filter is separated from source code of the application, and the execution filter can be downloaded and installed into the application to protect the application from the race during runtime without restart of the application, and wherein the update plan includes synchronization operations to enforce constraints described in the execution filter and information indicating where in the application to add the operations, and pre-conditions for installing the execution filter; and
   performing the synchronization operations as part of a software update based on the update plan that prevent the race from occurring.

9. The method of claim 8, further comprising preventing blocking calls from blocking updates.

10. The method of claim 8, further comprising adding the synchronization operations to the application based on the update plan.

11. The method of claim 8, further comprising executing an instrumented copy of at least a part of the application instead of the at least a part of the application in response to the update plan.

12. The method of claim 8, wherein the execution filter controls execution order of at least two portions of the application.

13. The method of claim 8, wherein the execution filter causes the execution of at least two portions of the application to be mutually exclusive.

14. The method of claim 8, wherein the execution filter causes a single portion of the application to be unilaterally executed.

15. A method for protecting an application from a race, comprising:

creating an execution filter that specifies how operations of an application are to be synchronized to filter out racy thread interleaving, wherein the execution filter is separated from source code of the application, and the execution filter can be downloaded and installed into the application to protect the application from the race during runtime without restart the application;

generating an update plan for updating the software of the application that is based on the execution filter, wherein the update plan includes synchronization operations to enforce the constrains described in the execution filter and information indicating where in the application to add the operations, and pre-conditions for installing the execution filter; and causing the synchronization operations to be performed at the application as part of a software update based on the update plan that prevent the race from occurring.

16. The method of claim 15, further comprising causing the synchronization operations to be added to the application based on the update plan.

17. The method of claim 15, further comprising causing an instrumented copy of at least a part of the application to be executing instead of the at least a part of the application in response to the update plan.

18. The method of claim 15, wherein the execution filter controls execution order of at least two portions of the application.

19. The method of claim 15, wherein the execution filter causes the execution of at least two portions of the application to be mutually exclusive.

20. The method of claim 15, wherein the execution filter causes a single portion of the application to be unilaterally executed.

\* \* \* \* \*